United States Patent [19]

Yanus et al.

[11] Patent Number: 5,262,512

[45] Date of Patent: Nov. 16, 1993

[54] POLYARYLAMINE POLYESTERS

[75] Inventors: John F. Yanus, Webster; William W. Limburg, Penfield; Dale S. Renfer, Webster, all of N.Y.

[73] Assignee: Xerox Corporation, Stamford, Conn.

[21] Appl. No.: 797,642

[22] Filed: Nov. 25, 1981

[51] Int. Cl.$^5$ .................... C08G 63/00; C08G 63/02
[52] U.S. Cl. .................... 528/181; 430/56; 430/57; 430/59; 528/182; 528/194; 528/272
[58] Field of Search ............... 528/181, 194, 182, 272; 430/56, 57, 59

[56] References Cited

U.S. PATENT DOCUMENTS

| | | | |
|---|---|---|---|
| 3,844,781 | 10/1974 | Tsuchiya et al. | 96/1.5 |
| 3,890,146 | 6/1975 | Nagashima et al. | 96/1.5 |
| 4,047,948 | 9/1977 | Horgan | 96/1.5 R |
| 4,052,205 | 10/1977 | Stolka et al. | 96/1 PC |
| 4,265,990 | 5/1981 | Stolka et al. | 430/59 |
| 4,273,846 | 6/1981 | Pai et al. | 430/59 |
| 4,346,158 | 8/1982 | Pai et al. | 430/59 |
| 4,388,392 | 6/1983 | Kato et al. | 430/58 |
| 4,415,641 | 11/1983 | Goto et al. | 430/59 |
| 4,588,666 | 5/1986 | Stolka et al. | 430/59 |
| 4,588,667 | 5/1986 | Jones et al. | 430/73 |
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,818,650 | 4/1989 | Limburg et al. | 430/56 |
| 5,034,296 | 7/1991 | Ong et al. | 430/59 |

FOREIGN PATENT DOCUMENTS 1171431  7/1984  Canada.
0295125 12/1988  European Pat. Off.
0396376 11/1990  European Pat. Off.

Primary Examiner—John Kight, III
Assistant Examiner—T. Mosley

[57] ABSTRACT

A polyarylamine polymer represented by the following formula:

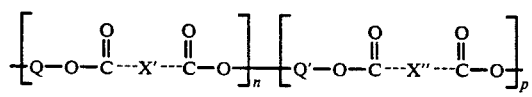

wherein:
n is between about 5 and about 5,000
p is between about 0 and about 5,000
X' and X" are independently selected from a group having bifunctional linkages,
Q is a divalent group derived from certain hydroxy terminated arylamine reactants, and
Q' is a divalent group derived from a hydroxy terminated group.

5 Claims, No Drawings

POLYARYLAMINE POLYESTERS

BACKGROUND OF THE INVENTION

This invention relates in general to polymeric tertiary arylamine compounds and, more specifically, to polyarylamine polyesters.

As more advanced, higher speed electrophotographic copiers, duplicators and printers were developed degradation of image quality was encountered during cycling. Moreover, complex, highly sophisticated, duplicating and printing systems operating at high speeds have placed stringent requirements including narrow operating limits on photoreceptors. For example, the numerous layers found in many modern photoconductive imaging members must be highly flexible, adhere well to to adjacent layers, be mechanically compatible with other flexible photoreceptor belt components, and exhibit predictable electrical characteristics within narrow operating limits to provide excellent toner images over many thousands of cycles. There is also a great current need for long service life, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, e.g. less than about 0.75 inch (19 mm) diameter, raise the threshold of mechanical performance criteria for photoreceptors to such a high level that spontaneous photoreceptor belt material failure becomes a frequent event for flexible belt photoreceptors.

One type of multilayered photoreceptor that has been employed as a belt in electrophotographic imaging systems comprises a substrate, a conductive layer, a charge blocking layer a charge generating layer, and a charge transport layer. The charge transport layer often comprises an activating small molecule dispersed or dissolved in a polymeric film forming binder. Generally, the polymeric film forming binder in the transport layer is electrically inactive by itself and becomes electrically active when it contains the activating molecule. The expression "electrically active" means that the materials is capable of supporting the injection of photogenerated charge carriers from the material in the charge generating layer and is capable of allowing the transport of these charge carriers through the electrically active layer in order to discharge a surface charge on the active layer. The multilayered type of photoreceptor may also comprise additional layers such as an anti-curl backing layer, required when layers possess different coefficient of thermal expansion values, an adhesive layer, and an overcoating layer. Commercial high quality photoreceptors have been produced which utilize an anti-curl coating, it is desirable, however, to eliminate this layer. The elimination of this layer would remove a process step, resulting in material savings, processing time savings, and an increasing yield due to the decrease in handling. In addition the presence of an anticurl back coating greatly increases the stress at the upper surface of the PR which can result in an increased propensity to cracking and crazing during the flexing experienced during use. Although excellent toner images may be obtained with multilayered belt photoreceptors that are developed with dry developer powder (toner), it has been found that these same photoreceptors become unstable when employed with liquid development systems. These photoreceptors suffer from cracking, crazing, crystallization of active compounds, phase separation of activating compounds and extraction of activating compounds caused by contact with the organic carrier fluid, isoparaffinic hydrocarbons e.g. Isopar ®, commonly employed in liquid developer inks which, in turn, markedly degrade the mechanical integrity and electrical properties of the photoreceptor. More specifically, the organic carrier fluid of a liquid developer tends to leach out activating small molecules, such as the arylamine containing compounds typically used in the charge transport layers. Representative of this class of materials are: N,N'-diphenyl-N,N'-bis(3-methylphenyl)-[1,1'-biphenyl]-4,4'-diamine; bis-(4-diethylamino-2-methylphenyl)-phenylmethane; 2,5-bis-(4'-dimethylaminophenyl)-1,3,4-oxadiazole; 1-phenyl-3-(4'-diethylaminostyryl)-5-(4''-diethylaminophenyl)pyrazoline; 1,1-bis-(4-(di-N,N'-p-methylphenyl)-aminophenyl)-cyclohexane; 4-diethylaminobenzaldehyde-1,1-diphenylhydrazone; 1,1-diphenyl-2(p-N,N-diphenylamino phenyl)-ethylene; N-ethylcarbazole-3-carboxaldehyde-1-methyl-1-phenylhydrazone. The leaching process results in crystallization of the activating small molecules, such as the aforementioned arylamine compounds, onto the photoreceptor surface and subsequent migration of arylamines into the liquid developer ink. In addition, the ink vehicle, typically a $C_{10}$–$C_{14}$ branched hydrocarbon, induces the formation of cracks and crazes in the photoreceptor surface. These effects lead to copy defects and shortened photoreceptor life. The degradation of the photoreceptor manifests itself as increased background and other printing defects prior to complete physical photoreceptor failure.

The leaching out of the activating small molecule also increases the susceptibility of the transport layer to solvent/stress cracking when the belt is parked over a belt support roller during periods of non-use. Some carrier fluids also promote phase separation of the activating small molecules, such as arylamine compounds and their aforementioned derivatives, in the transport layers, particularly when high concentrations of the arylamine compounds are present in the transport layer binder. Phase separation of activating small molecules also adversely alters the electrical and mechanical properties of a photoreceptor. The leachant, the hole transporting molecule, may also contaminate the liquid ink lowering the overall print quality. Although flexing is normally not encountered with rigid, cylindrical, multilayered photoreceptors which utilize charge transport layers containing activating small molecules dispersed or dissolved in a polymeric film forming binder, electrical degradation is similarly encountered during development with liquid developers. Sufficient degradation of these photoreceptors by liquid developers can occur in less than eight hours of use thereby rendering the photoreceptor unsuitable for even low quality xerographic imaging purposes.

Photoreceptors have been developed which comprise charge transfer complexes prepared with polymeric molecules. For example, charge transport complexes formed with polyvinyl carbazole are disclosed in U.S. Pat. Nos. 4,047,948, 4,346,158 and 4,388,392. Photoreceptors utilizing polyvinyl carbazole layers, as compared with current photoreceptor requirements, exhibit relatively poor xerographic performance in both electrical and mechanical properties. Polymeric arylamine molecules prepared from the condensation of di-secondary amine with a di-iodo aryl compound are disclosed in European patent publication 34,425, published Aug. 26, 1981 and issued May 16, 1984. Since these polymers are extremely brittle and form films which are very susceptible to physical damage, their use in a flexible belt configuration is precluded. Thus, in advanced imaging systems utilizing multilayered belt photoreceptors exposed to liquid development systems, cracking and crazing have been encountered in critical charge transport layers during belt cycling. Cracks developing in charge transport layers during cycling can be manifested as print-out defects adversely affecting copy quality. Furthermore, cracks in the photoreceptor pick up toner particles which cannot be removed in the cleaning step and may be transferred to the background in subsequent prints. In addition, crack areas are subject to delamination when contacted with blade cleaning devices thus limiting the options in electrophotographic product design. It should also be noted that the presence of an anti-curl back coating will exacerbate the propagation of cracks in brittle polymers.

Photoreceptors having charge transport layers containing small molecule arylamine compounds dispersed or dissolved in various resins such as polycarbonates are known in the art. Similarly, photoreceptors utilizing polymeric arylamine containing molecules such as polyvinyl carbazole and polymethacrylates possessing pendant arylamines are also known. Further, condensation polymers of a di-secondary amine with a di-iodo aryl compound are described in the prior art. Moreover, various polymers derived from a reaction of certain monomers with aromatic amines such as N,N'-diphenyl-N,N'-bis(3-hydroxyphenyl)-[1,1'-biphenyl]-4,4'-diamine have recently been described.

Recently photoreceptors having charge transport layers containing charge transporting arylamine polymers have been described in the patent literature. These polymers include the products of a reaction involving a dihydroxy arylamine reactant and are described, for example in U.S. Pat. Nos. 4,806,443, 4,806,443, 4,801,517 and 4,818,650, the entire disclosures of these patents being incorporated herein by reference. Although these polymers form excellent charge transport layers, many other polymeric derivatives of dihydroxy arylamines do not meet the numerous stringent requirements of sophisticated automatic electrophotographic systems. For example, the polymeric reaction products of dihydroxy arylamines and 1,3-diiodopropane form charge transport layers that possess very poor mechanical properties, are soft and non-robust and are of low molecular weight.

INFORMATION DISCLOSURE STATEMENT

U.S. Pat. No. 4,806,443 to Yanus et al, issued Feb. 21, 1989—An electrostatographic imaging member is disclosed in which the imaging member comprises a substrate and an electroconductive layer, the imaging member comprising a polymeric arylamine compound represented by a specific formula shown in the abstract.

U.S. Pat. No. 4,806,444 to Yanus et al, issued Feb. 21, 1989—An electrostatographic imaging member is disclosed in which the imaging member comprises a substrate and an electroconductive layer, the imaging member comprising a polymeric arylamine compound represented by a specific formula shown in the abstract.

U.S. Pat. No. 4,801,517 to Frechet et al, issued Jan. 31, 1989—An electrostatographic imaging member is disclosed in which the imaging member comprises a substrate and at least one electroconductive layer, the imaging member comprising a polymeric amine compound represented by a specific formula shown in the abstract.

U.S. Pat. No. 4,818,650 to Limburg et al., issued Apr. 4, 1989—An electrostatographic imaging member is disclosed in which the imaging member comprises a substrate and at least one electrophotoconductive layer, the imaging member comprising a polymeric arylamine compound represented by a formula shown in a specific the abstract.

Canadian Patent 1,171,431 corres. to European Patent Application 34,425 to Xerox, published Aug. 26, 1981, issued May 16, 1984. Condensation polymers of a di-secondary amine with a di-iodo aryl compound are described, for example, in working Examples IX and X.

Stolka et al., Photoconductivity and Hole Transport in Polymers of Aromatic Amine-Containing Methacrylates, Journal of Polymer Science: Polymer Chemistry Edition, vol. 21, 969 (1983)—Hole transport is described in high molecular weight arylamine-substituted polymethacrylates. Synthesis of the monomers, their polymerization, and the general properties of these polymers are also discussed.

U.S. Pat. No. 4,052,205 to Stolka et al., issued Oct. 4, 1977—A photoconductive imaging member is disclosed comprising various active polymers, such as poly-N-vinyl carbazole, in a transport layer, eg line 45, column 5 to line 27, column 6. Derivatives of the active polymers may be hydroxy substituted, e.g. column 5, lines 62-65.

U.S. Pat. No. 4,265,900 to Stolka et al., issued May 5, 1981—Transport layers are disclosed comprising small molecule arylamines and a polycarbonate resin binder.

U.S. Pat. No. 4,415,641 to Goto et al., issued Nov. 15, 1983—An electrophotographic light-sensitive element is disclosed comprising a carbazole derivative (see column 3, lines 1-14) $R_2$ can represent a hydroxy group.

U.S. Pat. No.4,588,666 to Stolka et al., issued May 13, 1986—A hole transporting molecule is disclosed comprising alkoxy derivatives of tetra phenyl biphenyl diamine (see column 3, lines 33-66). $R_1$ and $R_2$ represent alkoxy groups which include methoxy. Resins such as polyvinyl carbazoles, polycarbonate resins, epoxy resins, polyvinyl butyrals, polyhydroxyether resins may be used as a binder for the hole transporting molecule.

U.S. Pat. No. 4,047,948 to A. M. Horgan, issued Sep. 13, 1977—A photoreceptor is disclosed comprising layers which may contain polyvinyl carbazole. The use of small molecule arylamine activating compounds in transport layer is also disclosed. The preferred small molecule resin binder is a polycarbonate resin.

U.S. Pat. No. 4,346,158 to Pai et al., issued Aug. 24, 1982—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,388,392 to Kato et al., issued Jun. 14, 1987, A photoreceptor is disclosed comprising layers which may contain polyvinyl carbazole. The use of an electro-donating polycyclic aromatic hydrocarbon incorporated in an electron-donative polymeric photoconductor in a charge transporting layer is also disclosed.

U.S. Pat. No. 4,273,846 to Pai et al., issued Jun. 16, 1981. An imaging member is disclosed comprising a polycarbonate resin material and an arylamine (see the general formula, column 2, lines 21-34). Poly-N-vinyl carbazole may be employed in the generator layer.

U.S. Pat. No. 3,844,781 to Tsuchiya et al., issued Oct. 29, 1974—Various photoconductive materials are disclosed containing substitutents such as hydroxyl, amino and alkoxy groups.

U.S. Pat. No. 3,890,146 to Nagashima et al., issued Jun. 17, 1975—Various photoconductive materials are disclosed containing substituents such as hydroxyl, amino and alkoxy groups.

U.S. Pat. No. 4,588,667 to Jones, issued May 13, 1986—Various overcoated electrophotographic imaging members are disclosed including a multilayered imaging member having a substrate, a titanium metal layer, a siloxane blocking layer, an adhesive layer, a charge generating binder layer, and a charge transport layer. The transport layer may contain from about 25 to about 75 percent by weight of arylamine transport material in a resin binder such as polycarbonate resin.

U.S. Pat. No. 4,983,482 to Ong et al., issued Jan. 8, 1991—A photoresponsive imaging member is disclosed comprising a photogenerating layer and a hole transporting layer comprising a charge transport polyurethane having a specific formula.

In copending application Ser. No. 07/627,338, filed on Dec. 14, 1990 in the names of R. Yu, J. Spiewak and D. Nichol-Landry, an overcoated electrophotographic imaging member is disclosed in which the overcoating contains a polyester homopolymer which comprises a hole transport ester compound and an aliphatic diol in the polymer chain such as poly[oxydecamethyleneoxy-N,N'-diphenyl-N,N'bis(3-carbonylphenyl) benzidene.

In an application filed concurrently herewith in the names of John F. Yanus, William W. Limburg and Dale S. Renfer, entitled Electrophotographic Imaging Members Containing Polyarylamine Polyester and identified by the U.S. Pat. No. 5,149,609, Sep. 22, 1992 number a polyarylamine polymer is described which is the polymer of the instant invention.

Thus, there is a continuing need for multilayered photoreceptors having improved resistance to cracking, crazing, delamination, softening, swelling, crystallization of active compounds, phase separation of active compounds and leaching of active compounds. In addition to the ink compatiblity requirements the active compounds in charge transport layers must also have high resistivity for charge retention, high hole mobility for rapid discharge, and mechanical toughness for long life. Further, there is a continuing need for multilayered photoreceptors having improved resistance to cracking, crazing, delamination, crystallization of active compounds, and phase separation of active compounds when used in dry development applications where life is limited by the lack of robustness of the multilayered photoreceptor. There also exists the need to better match the coefficient of thermal expansion of the supporting substrate in a flexible belt architecture to provide a stress free flat surface and eliminating the need for an anti-curl back coating.

SUMMARY OF THE INVENTION

It is, therefore, an object of the present invention to provide an improved polymeric tertiary arylamine compound suitable for use in photoresponsive members which overcome the above-noted disadvantages.

It is yet another object of the present invention to provide an improved polymeric tertiary arylamine which exhibits greater resistance to cracking and crazing induced by liquid ink carrier fluid.

It is yet another object of the present invention to provide an improved polymeric tertiary arylamine which exhibits greater resistance to cracking and crazing when mechanically cycled in a belt-type configuration around a narrow diameter roller.

It is a further object of the present invention to provide a polymeric tertiary arylamine which exhibits resistance to component leaching during liquid development.

It is still another object of the present invention to provide a polymeric tertiary arylamine which exhibits resistance to component crystallization during liquid development.

It is a further object of the present invention to provide a polymeric tertiary arylamine which retains stable electrical properties during cycling.

It is yet another object of the present invention to provide an improved polymeric tertiary arylamine which resist absorption and wear when exposed to blade cleaning devices and dry xerographic developers.

It is further object of the present invention to provide an improved polymeric tertiary arylamine which exhibits resistance to softening and swelling when exposed to liquid ink carrier fluid.

The foregoing objects and others are accomplished in accordance with this invention by providing a polyarylamine polymer represented by formula I:

FORMULA I

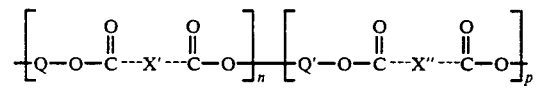

wherein:
n is between about 5 and about 5,000
p is between about 0 and about 5,000
X' and X" are independently selected from a group having bifunctional linkages,
Q is a divalent group derived from a hydroxy terminated arylamine reactant containing the group:

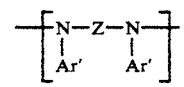

or

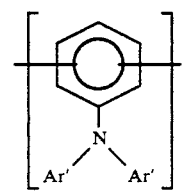

wherein:
Ar' is selected from the group consisting of:

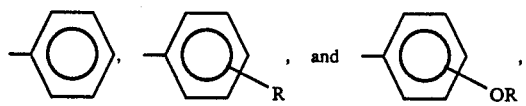

Z is selected from the group consisting of:

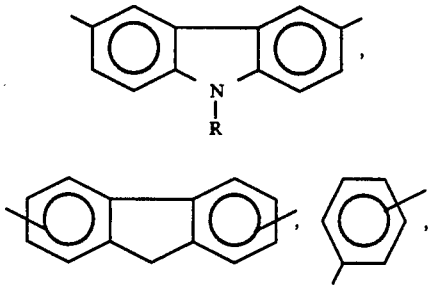

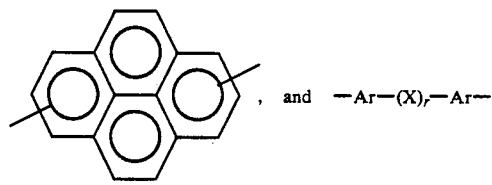, and —Ar—(X)$_r$—Ar— r is 0 or 1,
Ar is selected from the group consisting of:

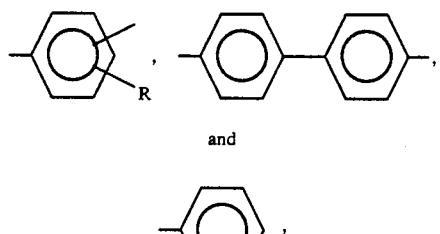

R is selected from the group consisting of —CH$_3$, —C$_2$H$_5$, —C$_3$H$_7$, and —C$_4$H$_9$,
X is selected from the group consisting of:

—CH$_2$—, —C(CH$_3$)$_2$—, —O—, —S—, 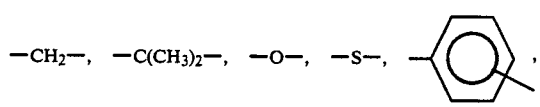

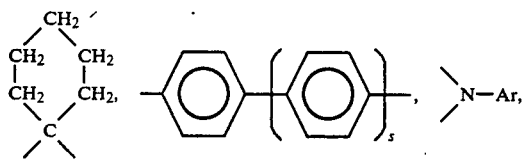

and

Q' is a divalent group derived from a hydroxy terminated group.

More preferably, the polyarylamine polymer is represented by the formula:

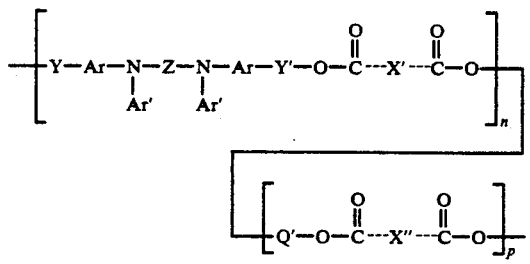

wherein:
n is between about 5 and about 5,000,
p is between about 0 and about 5,000,
Z is selected from the group consisting of:

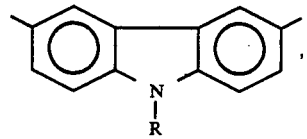

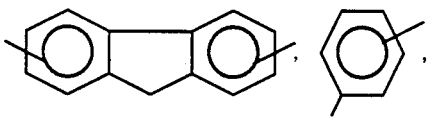

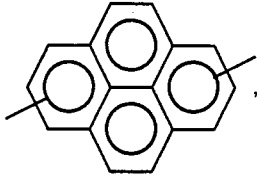, and —Ar—(X)$_r$—Ar— r is 0 or 1,
Ar is selected from the group consisting of:

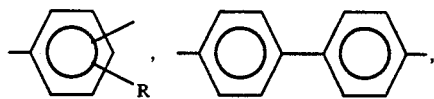

and

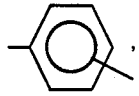

R is selected from the group consisting of —CH$_3$, —C$_2$H$_5$, —C$_3$H$_7$, and —C$_4$H$_9$,
X is selected from the group consisting of:

—CH$_2$—, —C(CH$_3$)$_2$—, —O—, —S—, 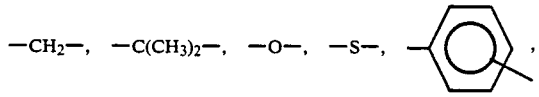

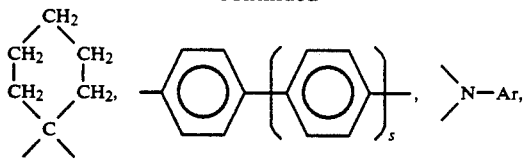

and

S is 0, 1 or 2,
Ar' is selected from the group consisting of:

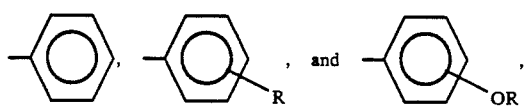

X' AND X" are independently selected from a group having bifunctional linkages, and
Y and Y' are independently selected from a group represented by the formula:

t is 0, 1, 2, 3, or 4, and
Q' is independently selected from the group having bifunctional linkages consisting of:

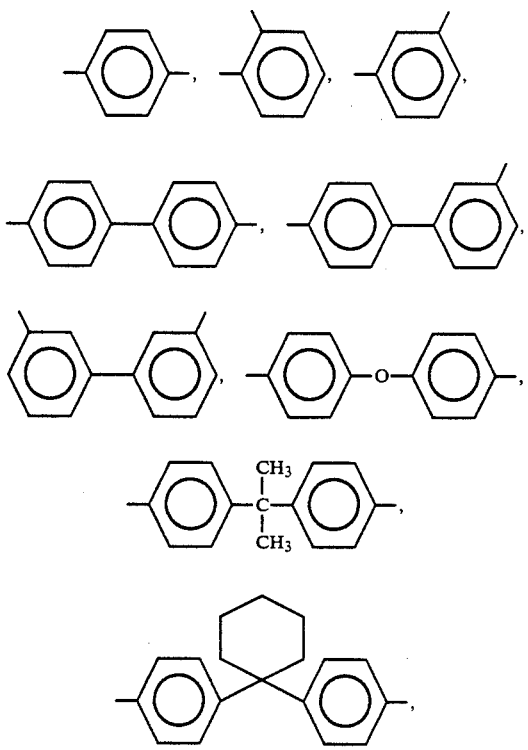

and

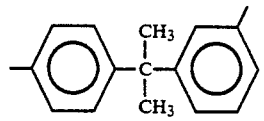

Generally, the polymeric arylamine compounds of this invention may be prepared by reacting a dihydroxy arylamine compound with a coreactant diacid chloride compound represented by the formula:

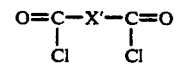

wherein X' is selected from the group consisting of a biradical selected from the group consisting of alkylene, arylene, substituted alkylene, substituted arylene and ether linkages represented by —R—O—R— where R is an alkylene moiety of 1-25 carbon atoms optionally interrupted by ether oxygens such as alkylene, arylene, substituted alkylene, substituted arylene and ether segments. Generally, the ether, alkylene and substituted alkylene bifunctional linkages contain from 1 to 25 carbon atoms. In addition a second diacid chloride compound is included in the reaction, the compound being represented by the formula:

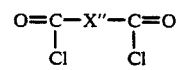

wherein X" is selected from the group consisting of a biradical selected from the group consisting of alkylene, arylene, substituted alkylene, substituted arylene and ether linkages represented by —R—O—R— where R is an alkylene moiety of 1-25 carbon atoms optionally interrupted by ether oxygens such as alkylene, arylene, substituted alkylene, substituted arylene, and ether segments, and X" may be the same as X'.

Illustrative examples of substituted or unsubstituted alkylene groups include those containing from about 1 to about 25 carbon atoms, and preferably from 1 to about 10 carbon atoms, such as methylene, dimethylene, trimethylene, tetramethylene, 2,2-dimethyltrimethylene, pentamethylene, hexamethylene, heptamethylene, and the like.

Illustrative examples of substituted or unsubstituted arylene linkages include the following:

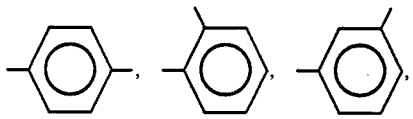

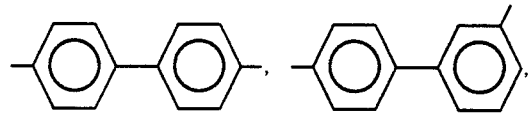

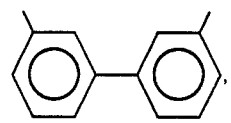

Examples of ether segments include those containing form about 2 to about 25 carbon atoms, such as —CH$_2$OCH$_2$—, —CH$_2$CH$_2$—OCH$_2$CH$_2$—, —CH$_2$CH$_2$—OCH$_2$—CH$_2$CH$_2$CH$_2$OCH$_2$CH$_2$—, —CH$_2$CH$_2$—(OCH$_2$CH$_2$)$_2$—, —CH$_2$CH$_2$CH(CH$_3$)OCH$_2$CH$_2$CH$_2$—, and the like. Examples of alkyl substituents include those with from 1 to about 25 carbon atoms, such as methyl, ethyl, propyl, isopropyl, butyl, isobutyl, pentyl, 2-methylpentyl, hexyl, octyl, nonyl, decyl, and the like, with methyl, ethyl, propyl, and butyl being preferred. aryl substituents include those with from 6 carbon atoms to about 24 carbon atoms, such as phenyl, tolyl, ethylphenyl, and naphthyl. The aryl groups can be substituted with alkoxy, hydroxy, halo, cyano, alkoxyalkyl, and the like.

Typical compounds represented by the above formula for the diacid chloride compound include:

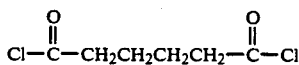

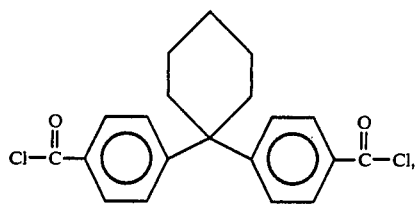

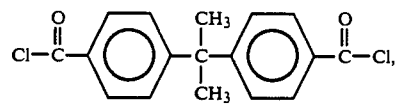

4,4'-diphenylisopropylidine diacidchloride

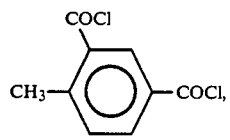

tolylene 2,4-diacidchloride

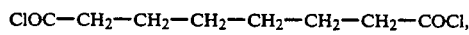

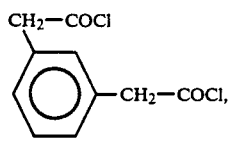

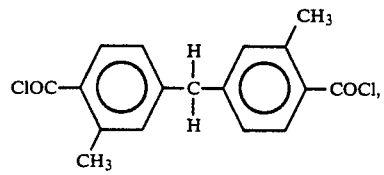

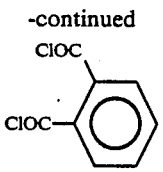

and

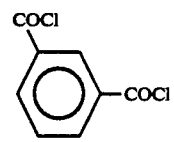

In one embodiment, polymeric arylamine compounds of this invention may be prepared by reacting the diacid chloride compound with a dihydroxy arylamine compound represented by the formula:

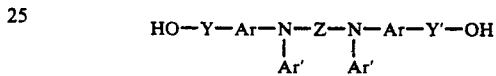

wherein:
Ar, Ar', Z, Y and Y' are defined above.

Compounds represented by the above hydroxy arylamine formula may be prepared by hydrolyzing an alkoxy arylamine, A typical process for preparing alkoxy arylamines is disclosed in Example I of U.S. Pat. No. 4,588,666 to Stolka et al, the entire disclosure of this patent being incorporated herein by reference. Typical compounds represented by the above formula for hydroxy arylamine compounds include:

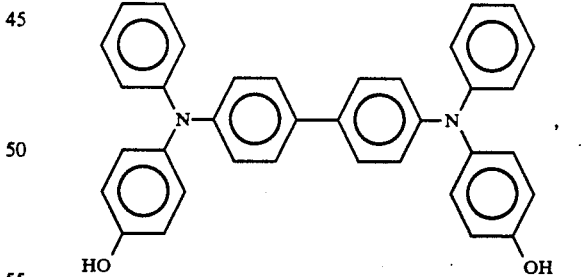

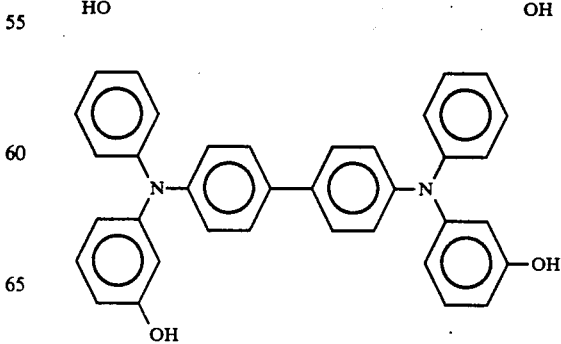

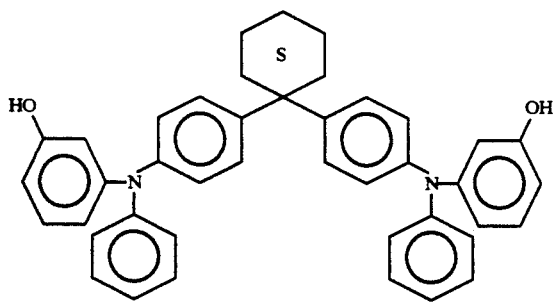

,

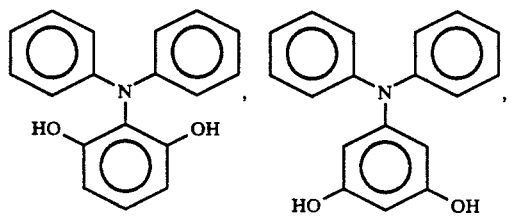

Compounds represented by the above hydroxy arylamine formula where t is 0, 1, 2, 3 or 4 may be prepared by reacting an arylamine compound having the formula:

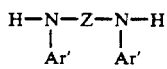

wherein: Z and Ar' are as defined above. Typical compounds represented by this formula include N,N'-diphenylbenzidine, N,N'-diphenyl-p-terphenyl diamine, N,N'-diphenyl-p,p'-diaminodiphenylether, N,N'-diphenyl-p,p'-cyclohexylidene diphenyldiamine, N,N'-diphenyl-p,p'-isopropylidene diphenyldiamine, N,N'-diphenyl-p,p'-methylidene diphenyldiamine, and the like. This arylamine compound is reacted with an iodobenzene compound such as m-bromoiodobenzene, m-chloroidobenzene, p-chloroiodobenzene, p-bromoiodobenzene, and the like to form an intermediate product represented by the formula:

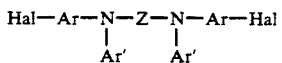

wherein: Z, Ar and Ar' are as defined above, Hal is bromine, chlorine or iodine. The bromine atoms in this intermediate product are thereafter are replaced by lithium. The resulting dilithio arylamine compound is reacted with ethylene oxide, formaldehyde, oxatane, or tetrahydrofuran. This reaction is worked up in the presence of an aqueous acid to form a hydroxy alkylene arylamine precursor represented by the formula:

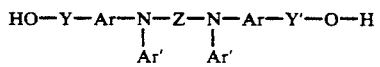

wherein: Z, Ar, Ar', Y, Y' are as defined above. This hydroxy alkylene arylamine precursor is then reacted with the co-reactant diacid chloride compound to form a polymeric arylamine of this invention.

The foregoing reactions are more specifically illustrated by the following reactions:

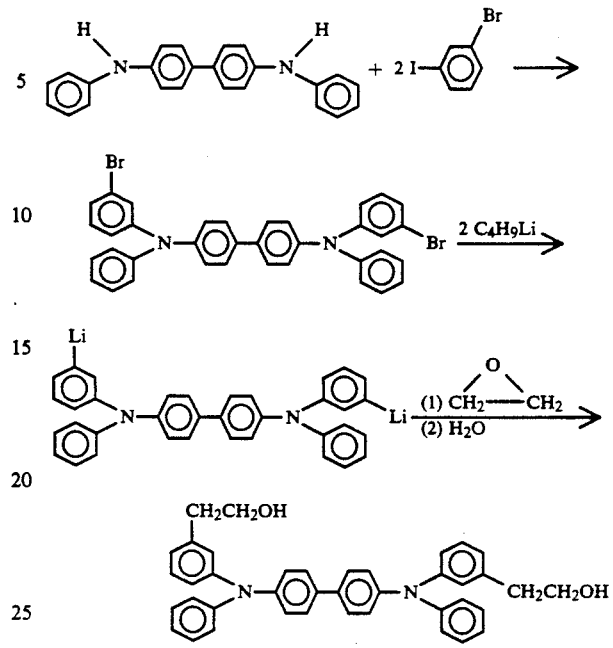

A typical process for preparing a hydroxy alkylene arylamine is disclosed in Examples II and III of U.S. Pat. No. 4,801,517, the entire disclosure of this patent being incorporated herein by reference.

Any suitable solvent may be employed to dissolve the reactants. Typical solvents include tetrahydrofuran, toluene, and the like. Satisfactory yields are achieved with reaction temperatures between about 0° C. and about 20° C. The reaction temperature selected depends to some extent on the specific reactants utilized and is limited by the temperature at which a cross linking side reaction my take place. The reaction temperature may be maintained by any suitable cooling technique.

The reaction time depends upon the reaction temperatures, the reactants used. Satisfactory results have been achieved with reaction times between about 40 minutes to about 90 minutes. For practical purposes, sufficient degree of polymerization is achieved by the time the reaction product layer is viscous.

One may readily determine whether sufficient reaction product has been formed by monitoring the increase in solution viscosity. An abrupt change in viscosity is noted as the polymerization is nearing completion. The weight average molecular weight of the polyarylamine polymer is between about 10,000 and about 1,000,000 and more preferably between about 50,000 and 500,000. Typical polymeric arylamine compounds used in this invention include, for example:

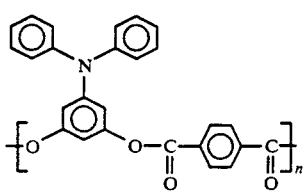

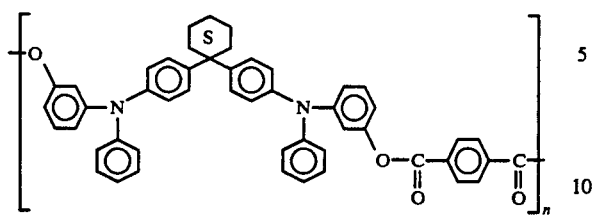

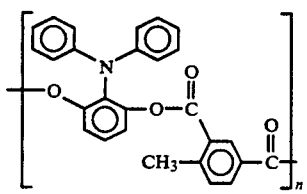

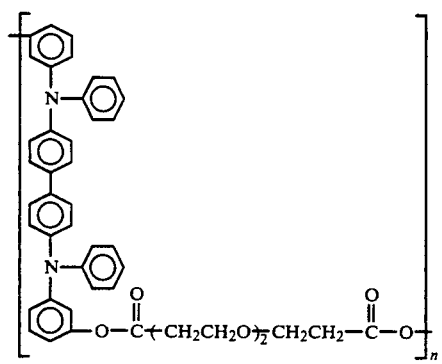

The "n" in the first appearing formula (FORMULA I) herein is defined as between about 5 and about 5,000. For the final polymers, "n" is defined as representing a number sufficient to achieve a weight average molecular weight of between about 20,000 and about 500,000 as represented in FORMULA I.

The following is an illustrative reaction between a specific diacid chloride compound and a specific dihydroxy arylamine compound:

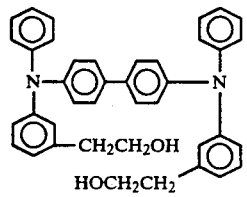

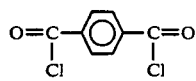

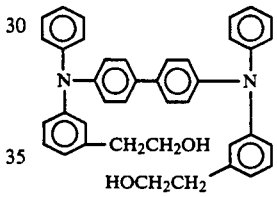

The following is still another illustrative reaction between another specific diacid chloride compound and a specific dihydroxy arylamine compound:

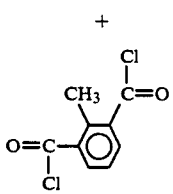

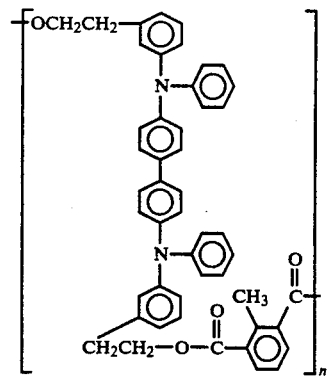

The following is an illustrative reaction between a preferred specific diacid chloride compound and a specific dihydroxy arylamine compound:

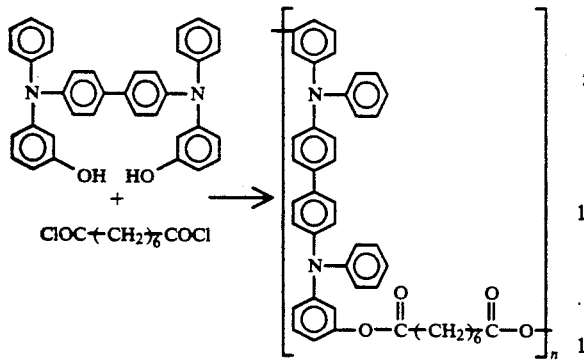

wherein the value of n was between about 40 and about 100. This polymer formed a viscous solution in tetrahydrofuran at a 10 percent by weight polymer concentration thereby further indicating that the material was a high molecular weight condensation polymer of between about 20,000 and about 500,000.

Multilayered photoconductive devices were fabricated with these polymers by applying methylene chloride solutions of the polymers to aluminum substrates bearing a 0.5 micrometer thick vapor deposited amorphous selenium layer. The deposited charge transport layers were then dried to a 15 micrometer thickness. These photoconductors were corona charged to a negative potential and thereafter discharged with a monochromatic light source of 4330 A wavelength. These photoreceptor devices exhibited low dark decay, high mobility and low residual charge.

High hole mobility is a requirement for hole transporting materials to enable the rapid cycling characteristics of modern photoreceptors. Substituents on the transporting moiety should be such that an undesirable perturbation of the electronic environment, affecting its transporting ability, does not occur. Substituents that reduce mobility are those which withdraw electron density from the transporting moiety. Examples of these electronegative substituents include, $NO_2$, CN, $CF_3$, >C=O, etc. Transport polymers in which the connective linkage places an electronegative group in conjugation with the active transport moiety will exhibit poorer mobilities. For example, polymers of the type disclosed in the copending application, Ser. No. 07/627,338, in which the carbonyl of the ester linkage is in conjugation with the transport moiety, results in a lower moiety material and hence restricting its use to a thin overcoating layer.

The arylamine transporting moieties of the polymers for the imaging members of this invention are rather rigid units, e.g. tetraphenylbenzidine, triphenylamine and they like. When incorporated in polymeric structures, this unit can be considered a rigid-rod unit (RRU). In condensation polymers, rigid-rod structures result in polymers of impaired flexibility, reduced adhesion and a tendency to crack. Counterbalancing this in part is the cohesiveness inherent in most condensation polymers due to the presence of dipole-dipole interaction (in this case the dipole associated with the carbonyl unit). The class of polymers in this invention possesses a flexible unit (FLU) to reduce the brittleness and improve other mechanical properties of the resultant polymer. The flexible units (FLU) in the charge transporting polymers of this invention are derived from the diacid chloride compound represented by the generic formula above. In diethylene glycol diacid chloride, triethylene glycol diacid chloride and trans-1,4-cyclohexylene diacid chloride-1,6-hexane, the presence of ether units and/or methylene units impart a substantial degree of flexibility because it possesses minimal hinderance to bond rotation. Generally, for those applications in which greater flexibility is required, polymers derived from diacid chlorides containing ether units and/or methylene units are preferred whereas for those applications in which greater hardness or creep resistance is required, polymers derived from diacid chlorides containing aromatic rings and/or double bond units are preferred. Thus, it is possible to tailor the physical properties to the intended use.

The following structures illustrate and compare polyester structures derived from diacid chlorides containing aromatic rings and/or double bond units with polyester structures derived from diacid chlorides containing ether units and/or methylene units. The rigid-rod units (RRU) of the arylamine moiety are represented by rectangles and rigid units associated with specific diacid chlorides are shown as crosshatched rectangles. The flexible units (FLU) derived from diacid chlorides are shown as springs.

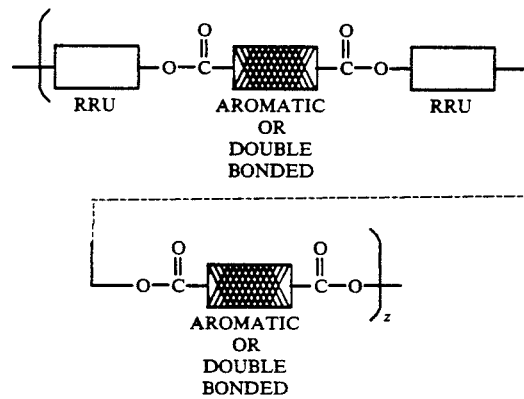

z and m are between about 5 and about 5,000. Thus, the flexible units (FLU) of the polymer of this invention reduce the brittleness and improve other mechanical properties such as tensile toughness whereas the modulus and hardness are increased with polymers derived from diacid chlorides containing aromatic rings and/or double bonds.

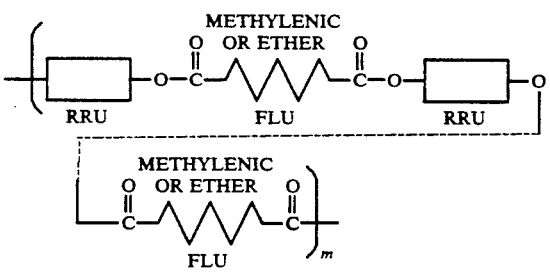

An electrophotographic member containing the electrically active polymeric arylamine of the present invention in at least the generator or transport layer may be employed in any suitable and conventional electrophotographic imaging process which utilizes charging prior to imagewise exposure to activating electromagnetic radiation. Conventional positive or reversal development techniques may be employed to form a marking material image on the imaging surface of the electrophotographic imaging member of this invention. Thus, by applying a suitable electrical bias and selecting toner having the appropriate polarity of electrical charge, one may form a toner image in the negatively charged areas or discharged areas on the imaging surface of the electrophotographic member of the present invention. More specifically, for positive development, charged toner particles of one polarity are attracted to the oppositely charged electrostatic areas of the imaging surface and for reversal development, charged toner particles are attracted to the discharged areas of the imaging surface. Where the transport layer of this invention is sandwiched between a photogenerating layer and a conductive surface, a positive polarity charge is normally applied prior to imagewise exposure to activating electromagnetic radiation. Where the photogenerating layer is sandwiched between a transport layer and a conductive surface, a negative polarity charge is normally applied prior to imagewise exposure to activating electromagnetic radiation. As is well known in the art, the conductive layer may be omitted and the opposite sides of the generator and transport layer assembly may be simultaneously charged with charges of opposite polarity to achieve the equivalent effect of a conductive layer.

The polymeric tertiary arylamine of the present invention exhibits greater resistance to cracking, crazing, crystallization of arylamine compounds, phase separation of arylamine compounds are leaching of arylamine compounds during cycling if exposed to a xerographic liquid developer, than conventional two component hole transporting compositions.

The invention will now be described in detail with respect to the specific preferred embodiments thereof, it being understood that these examples are intended to be illustrative only and that the invention is not intended to be limited to the materials, conditions, process parameters and the like recited herein. All parts and percentages are by weight unless otherwise indicated.

EXAMPLE I

Into a 250 milliliter three-necked round bottom flask equipped with a mechanical stirrer, an argon gas inlet, a thermometer and a dropping funnel was placed 10.4 grams N,N'-diphenyl N,N'-bis-(3-hydroxyphenyl)-[1,1' biphenyl] 4,4'-diamine (0.02 mole), 100 milliliters tetrahydrofuran and 8.4 milliliter triethylamine (0.06 mole). The contents of the flask were cooled with a water bath and the temperature was maintained at 15° C. throughout the dropwise addition of 3.6 milliliters double distilled suberoyl chloride (0.02 mole) dissolved in 50 milliliters tetrahydrofuran. A colorless precipitate of triethylamine hydrochloride formed after approximately 5 drops of acid chloride solution had been added. After 60 minutes, the addition was complete and the viscous mixture allowed to stir for 15 minutes. The polymer solution was filtered to remove the triethylamine hydrochloride. The colorless polymer solution was precipitated into methanol, filtered and dried. Yield was 12.1 grams. MW 66,000.

Purification: In a 250 milliliter Erlenmeyer flask was 10 grams crude polymer was mixed with and 100 milliliter tetrahydrofuran. The mixture was agitated with a magnetic stirred until the polymer was completely dissolved. While stirred was maintained, 4 grams F-20 alumina (Alcoa) was added. After 90 minutes, the polymer solution was filtered, precipitated into methanol and dried. Yield was 9.7 grams.

EXAMPLE II

Into a 250 milliliter three-necked round bottom flask equipped with a mechanical stirrer, an argon gas inlet, a thermometer and a dropping funnel was placed 10.4 grams N,N'-diphenyl N,N'-bis-(3-hydroxyphenyl)-[1,1' biphenyl] 4,4'-diamine (0.02 mole), 100 milliliters tetrahydrofuran and 8.4 milliliters triethylamine (0.06 mole). The contents of the flask were cooled with a water bath and the temperature was maintained at 15° C. throughout the dropwise addition of 4.9 milliliters double distilled azelaoyl chloride (0.02 mole) dissolved in 50 milliliters tetrahydrofuran. A colorless precipitate of triethylamine hydrochloride formed after approximately 5 drops of acid chloride solution had been added. After 60 minutes, the addition was complete and the viscous mixture allowed to stir for 15 minutes. The polymer solution was filtered to remove the triethylamine hydrochloride. The colorless polymer solution was precipitated into methanol, filtered and dried. Yield was 12.0 grams. MW 67,000.

Purification: In a 250 milliliter Erlenmeyer flask 10 grams crude polymer was mixed with and 100 milliliter tetrahydrofuran. The mixture was agitated with a magnetic stirred until the polymer was completely dissolved. While stirring was maintained, 4 grams F-20 alumina (Alcoa) was added. After 90 minutes, the polymer solution was filtered, precipitated into methanol and dried. Yield was 9.7 grams.

EXAMPLE III

Into a 250 milliliter three-necked round bottom flask equipped with a mechanical stirrer, an argon gas inlet, a thermometer and a dropping funnel was placed 15.6 grams N,N'-diphenyl N,N'-bis-(3-hydroxyphenyl)-[1,1' biphenyl] 4,4'-diamine (0.03 mole), 100 milliliters tetrahydrofuran and 12.6 milliliters triethylamine (0.09 mole). The contents of the flask were cooled with a water bath and the temperature was maintained at 15° C. throughout the dropwise addition of 6.4 milliliters double distilled sebacoyl chloride (0.03 mole) dissolved in 50 milliliters tetrahydrofuran. A colorless precipitate of triethylamine hydrochloride formed after approximately 5 drops of acid chloride solution had been added. After 60 minutes, the addition was complete and the viscous mixture allowed to stir for 15 minutes. The polymer solution was filtered to remove the triethylamine hydrochloride. The colorless polymer solution was precipitated into methanol, filtered and dried. Yield was 19.3 grams. MW 103,000.

Purification: In a 250 milliliter Erlenmeyer flask 10 grams crude polymer was mixed with and 100 milliliter tetrahydrofuran. The mixture was agitated with a magnetic stirred until the polymer was completely dissolved. While stirred was maintained, 4 grams F-20 alumina (Alcoa) was added. After 90 minutes, the polymer solution was filtered, precipitated into methanol and dried. Yield was 9.7 grams.

EXAMPLE IV

Into a 250 milliliter three-necked round bottom flask equipped with a mechanical stirrer, an argon gas inlet, a thermometer and a dropping funnel was placed 15.6 grams N,N'-diphenyl N,N'-bis-(3-hydroxyphenyl)-[1,1' biphenyl] 4,4'-diamine (0.03 mole), 100 milliliters tetrahydrofuran and 12.6 milliliters triethylamine (0.09 mole). The contents of the flask were cooled with a water bath and the temperature was maintained at 15° C. throughout the dropwise addition of 7.5 milliliters double distilled suberoyl chloride (0.03 mole) dissolved in 50 milliliters tetrahydrofuran. A colorless precipitate of triethylamine hydrochloride formed after approximately 5 drops of acid chloride solution had been added. After 60 minutes, the addition was complete and the viscous mixture allowed to stir for 15 minutes. The polymer solution was filtered to remove the triethylamine hydrochloride. The colorless polymer solution was precipitated into methanol, filtered and dried. Yield was 19.6 grams, MW 110,000.

Purification: In a 250 milliliter Erlenmeyer flasks 10 grams crude polymer was mixed with and 100 milliliters tetrahydrofuran. The mixture was agitated with a magnetic stirrer until the polymer was completely dissolved. While stirring was maintained, 4 grams F-20 alumina (Alcoa) was added. After 90 minutes, the polymer solution was filtered, precipitated into methanol and dried. Yield was 9.7 grams.

EXAMPLE V

Preparation of a photosensitive member utilizing a polymer of this invention.

An epoxy phenolic barrier layer about 0.5 micrometer thick was formed on a 3 mil aluminum substrate by dip coating. A 1 micrometer thick layer of amorphous selenium was the vacuum evaporated on the coated aluminum substrate by a conventional vacuum deposition technique such as the technique disclosed in Bixby in U.S. Pat. Nos. 2,753,278 and 2,970,906.

This vacuum deposition was carried out at a vacuum of $10^{-6}$ Torr while the substrate was maintained at a temperature of about 50° C. during the vacuum deposition. A charge transport layer was prepared by dissolving 10 milliliters of tetrahydrofuran and 1.5 grams of the polymer, as prepared in example III. A layer of this mixture was formed on the amorphous selenium layer using a Bird film applicator. The coating was then vacuum dried a 40° C. for 18 hours to form a 22 micrometer thick dry layer of the charge transport polymer. The plate was tested for its photoconductive property by first negatively corona charging to a field of 50 volts/micrometer and exposing to a blue light flash of 4330 Angstrom wavelength, 2 microseconds duration and 25 ergs/cm² light intensity. The device discharged to a very low potential of less than 50 volts indicating good photoconductive properties.

Although the invention has been described with reference to specific preferred embodiments, it is not intended to be limited thereto, rather those skilled in the art will recognize that variations and modification may be made therein which are within the spirit of the invention and within the scope of the claims.

What is claimed is:
1. A polyarylamine polymer represented by the formula:

FORMULA I

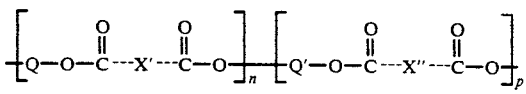

wherein:
n is between about 5 and about 5,000
p is between about 0 and about 5,000

X' and X" are independently selected from a biradical selected from the group consisting of alkylene, arylene, substituted alkylene, substituted arylene and ether linkages represented by —R—O—R— where R is an alkylene moiety of 1-25 carbon atoms optionally interrupted by ether oxygens, Q is a divalent group derived from a hydroxy terminated arylamine reactant containing the group:

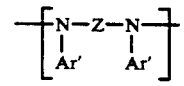

or

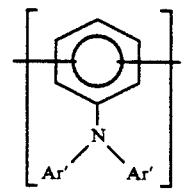

Q' is a divalent group derived from a hydroxy terminated group
wherein:
Ar' is selected from the group consisting of:

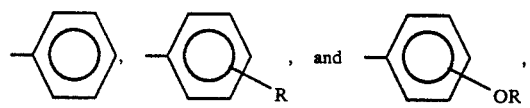

Z is selected from the group consisting of:

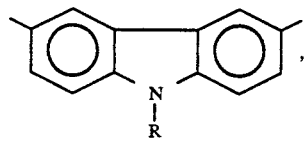

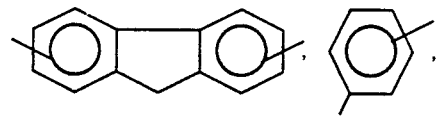

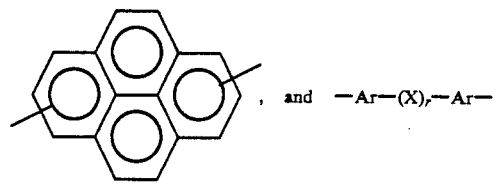, and —Ar—(X)$_r$—Ar— r is 0 or 1,
Ar is selected from the group consisting of:

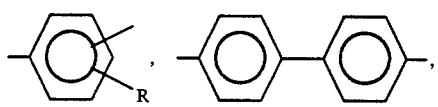

and

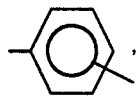

R is selected from the group consisting of —CH₃, —C₂H₅, —C₃H₇, and —C₄H₉, and
X is selected from the group consisting of:

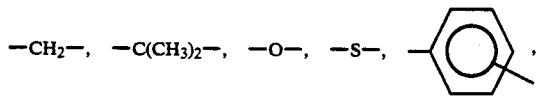

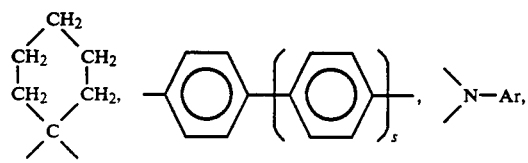

and

2. A polyarylamine polymer according to claim 1 wherein said polyarylamine polymer is represented by the formula:

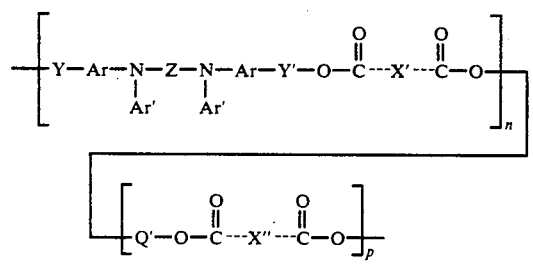

wherein:
n is between about 5 and about 5,000,
p is between about 0 and about 5,000,
Z is selected from the group consisting of:

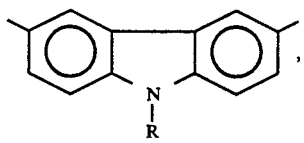

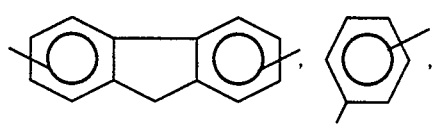

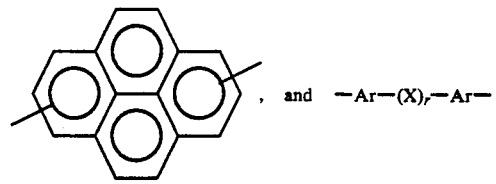

r is 0 or 1,
Ar is selected from the group consisting of:

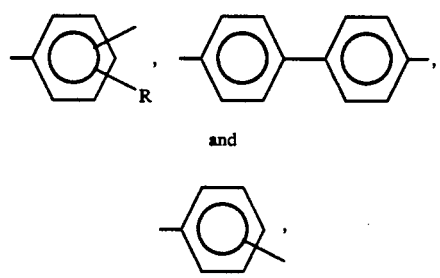

R is selected from the group consisting of —CH₃, —C₂H₅, —C₃H₇, and —C₄H₉,
X is selected from the group consisting of:

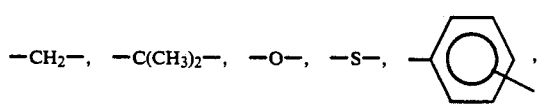

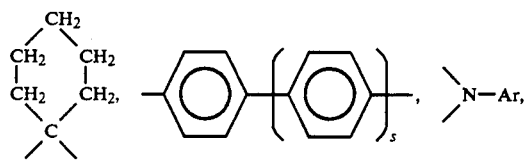

and

s is 0, 1 or 2,
Ar' is selected from the group consisting of:

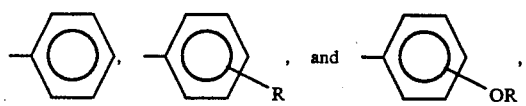

X' and X'' are a biradical independently selected from the group consisting of alkylene, arylene, substituted alkylene, substituted arylene and ether linkages represented by —R—O—R— where R is an alkylene moiety of 1–25 carbon atoms optionally interrupted by ether oxygens, and
Y and Y' are independently selected from a group represented by the formula:

t is 0, 1, 2, 3, or 4, and

Q' is independently selected from the group having bifunctional linkages consisting of:

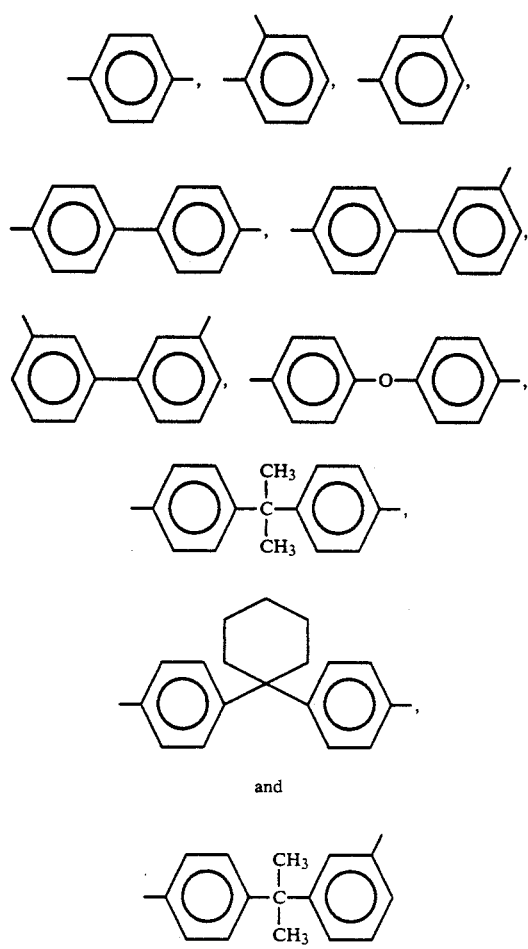

and

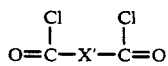

3. A polyarylamine polymer according to claim 1 wherein said polyarylamine polymer is the reaction product of a dihydroxy arylamine compound and a co-reactant di-acidchloride compound represented by the formula:

$$O=\overset{Cl}{\underset{}{C}}-X'-\overset{Cl}{\underset{}{C}}=O$$

wherein X' is a biradical selected from the group consisting of alkylene, arylene, substituted alkylene, substituted arylene and either linkages represented by —R—O—R— where R is an alkylene moiety of 1-25 carbon atoms optionally interrupted by ether oxygens.

4. A polyarylamine polymer according to claim 3 wherein an additional dicompound is included in said reaction, said additional dihydroxy terminated compound being selected from the group consisting of:

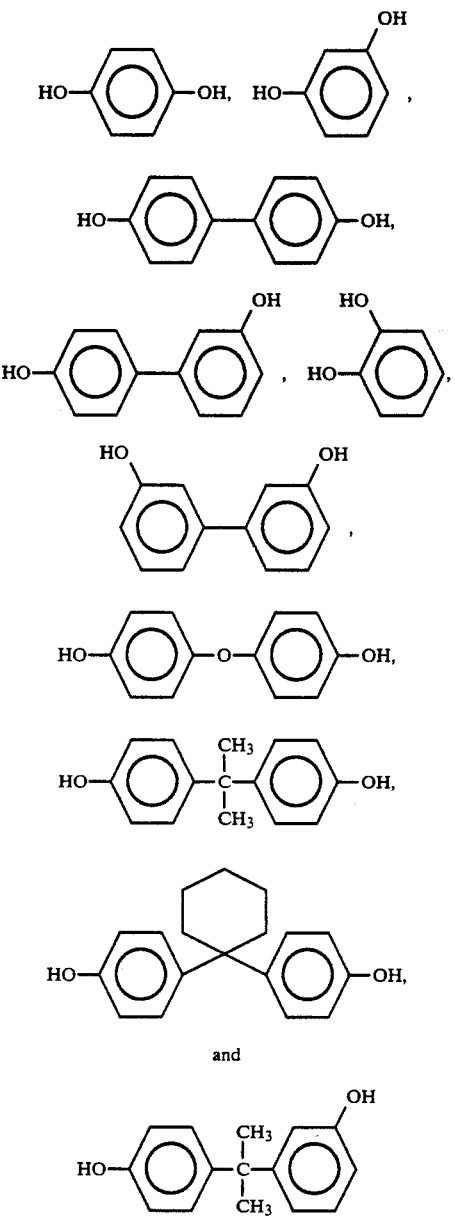

5. A polyarylamine polymer according to claim 4 wherein said polymer has a weight average molecular weight of between about 50,000 and about 500,000.

* * * * *